US006975320B1

(12) United States Patent
Bentz (10) Patent No.: US 6,975,320 B1
(45) Date of Patent: Dec. 13, 2005

(54) METHOD AND APPARATUS FOR LEVEL-OF-DETAIL COMPUTATIONS

(75) Inventor: Ole Bentz, Portland, OR (US)

(73) Assignee: Micron Technology, Inc., Boise, ID (US)

(*) Notice: Subject to any disclaimer, the term of this patent is extended or adjusted under 35 U.S.C. 154(b) by 417 days.

(21) Appl. No.: 09/735,689

(22) Filed: Dec. 12, 2000

(51) Int. Cl.[7] ............................................. G06T 17/00
(52) U.S. Cl. ..................................... 345/428; 345/582
(58) Field of Search ...................... 708/512; 345/428, 345/587, 582, 419, 420, 421, 422, 423, 424, 345/426, 427, 506, 522, 581, 583, 584, 585, 345/586, 592, 615

(56) References Cited

U.S. PATENT DOCUMENTS

| | | | |
|---|---|---|---|
| 5,831,624 A | 11/1998 | Tarolli et al. | 345/430 |
| 5,877,771 A | 3/1999 | Drebin et al. | 345/430 |
| 5,953,015 A * | 9/1999 | Choi | 345/428 |
| 6,005,582 A | 12/1999 | Gabriel et al. | 345/430 |
| 6,292,191 B1 * | 9/2001 | Vaswani et al. | 345/582 |
| 6,313,838 B1 | 11/2001 | Deering | 345/420 |
| 6,469,700 B1 * | 10/2002 | Munshi et al. | 345/419 |
| 6,597,363 B1 | 7/2003 | Duluk, Jr. et al. | 345/506 |
| 6,674,430 B1 | 1/2004 | Kaufman et al. | 345/419 |
| 2001/0020948 A1 | 9/2001 | Piazza et al. | 345/586 |

OTHER PUBLICATIONS

National Semiconductor, Easy Logarithms For COP4000, Sep. 1986, pp 1-12.*

* cited by examiner

Primary Examiner—Kee M. Tung
Assistant Examiner—Enrique L. Santiago
(74) Attorney, Agent, or Firm—Dorsey & Whitney LLP (57) ABSTRACT

A method and apparatus for computing a level-of detail (LOD) value for the of texels of a texture map to pixels of a graphics image adapted to receive signals representing texel coordinates for texels of a texture map and pixel coordinates for pixels of a graphics image to calculate a level-of-detail (LOD). The apparatus computes the LOD by calculating the square of the ratio between the number of texels applied to one pixel from the texel and pixel coordinates, approximating a base-two logarithm of the square of the ratio, and dividing the result of the approximation by two to compute the LOD.

32 Claims, 5 Drawing Sheets

METHOD AND APPARATUS FOR LEVEL-OF-DETAIL COMPUTATIONS

TECHNICAL FIELD

The present invention is related generally to the field of computer graphics, and more particularly, to a method and apparatus for computing level-of-detail in a computer graphics processing system.

BACKGROUND OF THE INVENTION

In graphics image processing systems, application of texture maps to the surfaces of graphics primitives are used to create the appearance of texture on a rendered graphics image. Texture maps are typically graphics images composed of "texels" that are arranged in a rectangular coordinate system. Thus, a texture map has an associated width and height. In applying the texture map to the surface of a graphics primitive, the texel coordinates of texels that are needed to calculate the color value of a pixel in a rendered graphics image are identified, and the color data associated with the identified texels are retrieved from memory. The color value of the pixel is then calculated from the retrieved color values using one of various well-known techniques. Consequently, when a texture map is applied to the surface, the surface adopts the characteristics of the texture, such that the coloring for the surface is derived from the texture. The applied texture map results in a realistic texture appearance in the rendered graphics image.

Prevailing computer graphics application program interfaces (APIs), such as OpenGL and Direct3D, have long supported a technique called "mipmapping." MIP stands for multim in parvum or "many in few." Mipmapping is a process by which graphics applications dynamically can trade off rendering speed for texture image detail. The underlying idea is that distant objects do not need to be rendered at the same level of detail (LOD) as objects that are close. To this end, a graphics processing system may use variations of the same texture map at different resolutions or sizes for objects located at different distances from the viewer.

As one would imagine, there are various considerations in deciding the LOD in mipmapping operations. For example, the distance of the object (or its size) is one parameter. Another consideration is the size of the texture image being applied. When these parameters are considered together, the LOD calculation can be reduced to a relationship between pixels and texels. That is, if one pixel step (in screen coordinates) is equal to one texel step (in texture coordinates) then the ratio is 1-to-1 and the LOD is $\log_2(1/1)$ or zero. If one pixel step is equal to a two texel step, than the ratio is 2-to-1 and LOD is equal to $\log_2(2/1)$ or one. For a four texel step per pixel, LOD is equal to $\log_2(4/1)$ or two.

Although LOD computations such as those previously described are conceptually simple, hardware implementation of the same is typically cumbersome because the computations involve complex calculations, such as texture coordinate gradients, two-function derivatives, base-two logarithm conversion, and the like. As previously illustrated, solving the base-two logarithm is an integral part of this computation. However, the base-two logarithm computation is particularly cumbersome because of the cost of implementing the computation in hardware. One approach to the base-two logarithm computation is the use of a table lookup with predetermined locked to values stored in each table entry. Another approach is the use of piece-wise linear functions with tables storing the parameters for the various sections of linear approximations. More complex alternatives use second-order (or higher) polynomial approximations for ranges of input, typically using fewer table entries, each holding more parameters than the linear versions. These approaches have been proven and can be designed for desired error characteristics. However, the conventional approaches typically consume a relatively large amount of space for implementation. Where the graphics processing system is implemented on a single device, or where space in a single device is at a premium, the aforementioned conventional approaches may not be acceptable alternatives.

Therefore, there is a need for an area efficient method and apparatus for performing level-of-detail computations.

SUMMARY OF THE INVENTION

The present invention relates to a method and apparatus for computing a level-of detail (LOD) value for the of texels of a texture map to pixels of a graphics image. The apparatus computes the LOD by calculating the square of the ratio between the number of texels for one pixels, approximating a base-two logarithm of the square of the ratio, and dividing the result by two to compute the LOD.

DETAILED DESCRIPTION OF THE INVENTION

Embodiments of the present invention provide an area efficient method and apparatus for performing base-2 logarithm for level of detail (LOD) computations in graphics processing systems. The apparatus can be implemented to meet arbitrary error constraints, and can be implemented in very little chip area compared with conventional circuits. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
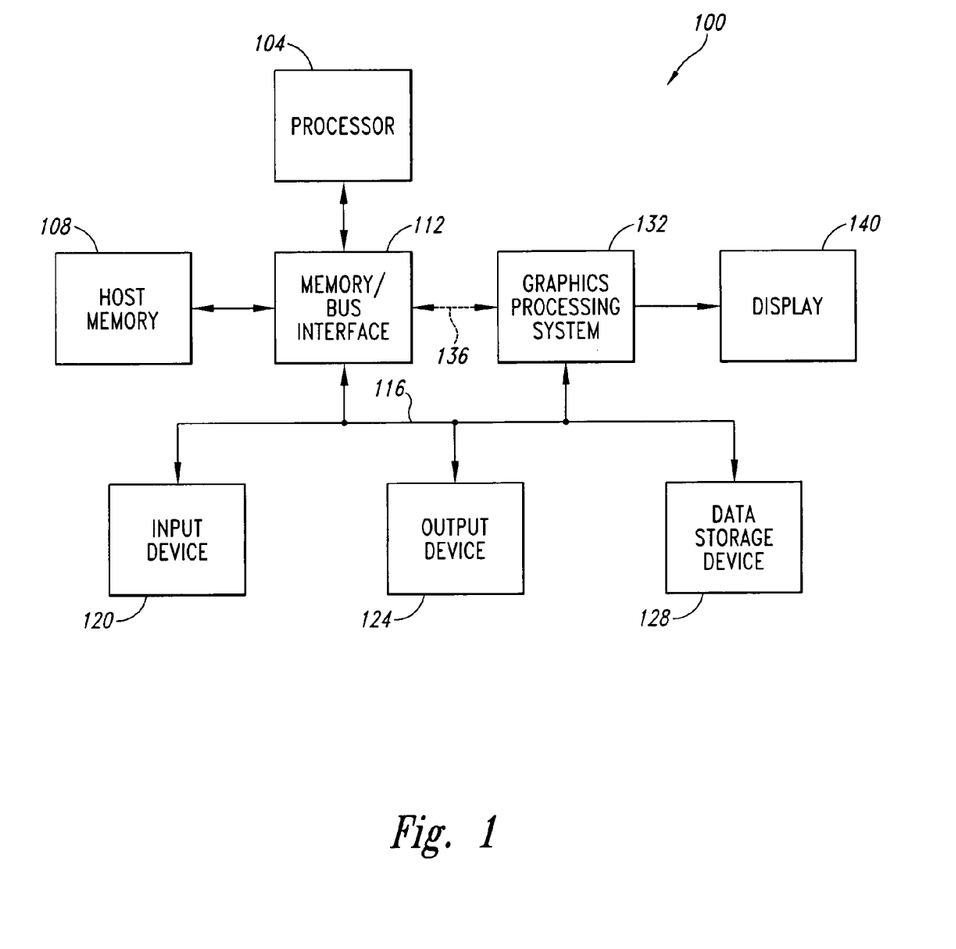
FIG. 1 is a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications.

Figure 2:
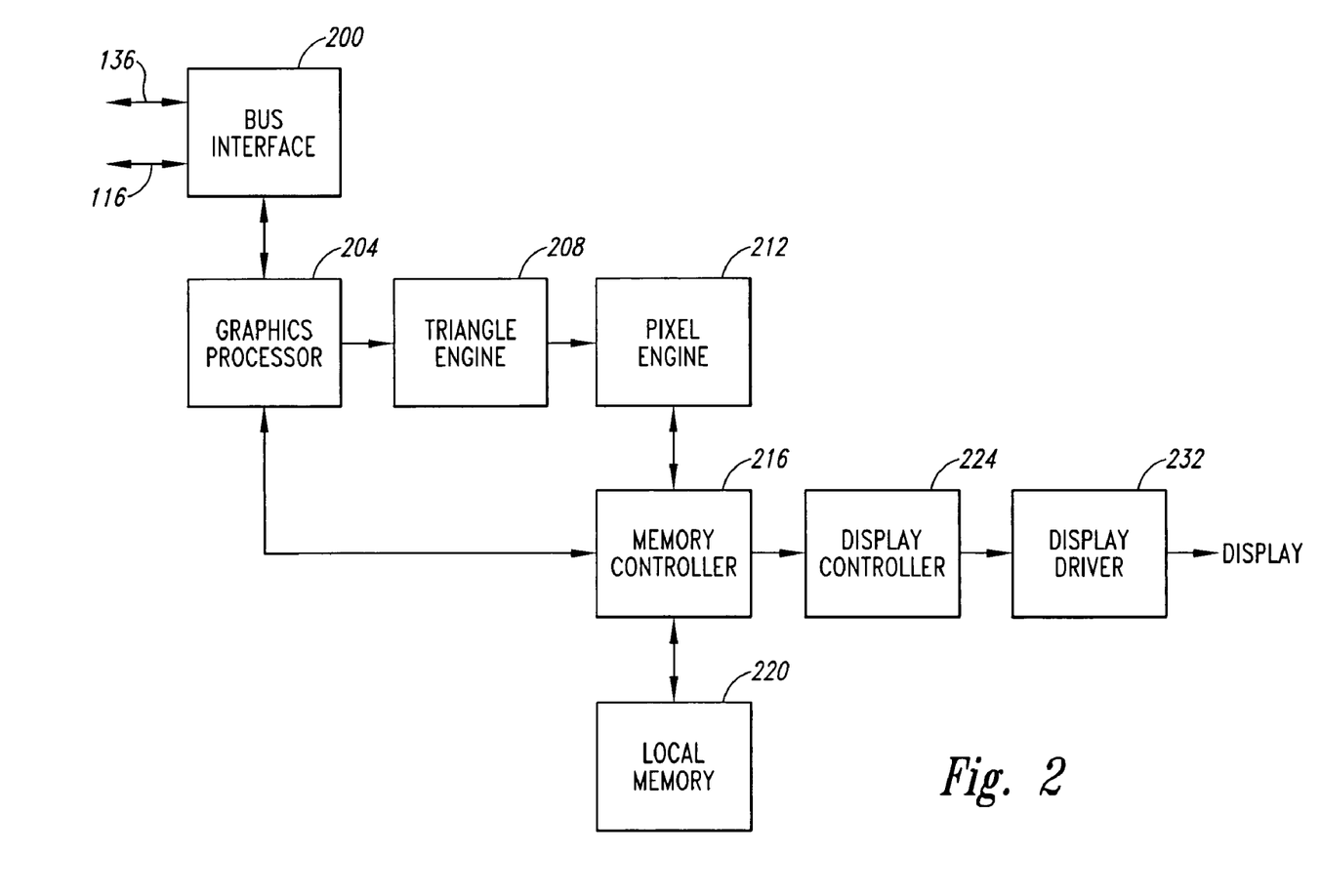
FIG. 2 is a block diagram of a graphics processing system in the computer system of FIG. 1.

FIG. 2 illustrates circuitry included within the graphics processing system 132 for performing various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as clipping, attribute transformations, and rendering of graphics primitives.

A pixel engine 212 is coupled to receive the graphics data generated by the triangle engine 208. The pixel engine 212 contains circuitry for performing various graphics functions, such as, but not limited to, calculating texel coordinates of a texture map, texture application or mapping, bilinear filtering, fog, blending, and color space conversion. The graphics functions are performed by a pixel processing pipeline 214 that is included in the pixel engine 212.

A memory controller 216 coupled to the pixel engine 212 and the graphics processor 204 handles memory requests to and from an local memory 220. The local memory 220 stores graphics data, such as source pixel color values aid destination pixel color values. A display controller 224 is coupled to the memory controller 216 to receive processed destination color values for pixels that are to be rendered. The destination color values are subsequently provided to a display driver 232 that includes circuitry to provide digital color signals, or convert digital color signals to red, green, and blue analog color signals, to drive the display 140 (FIG. 1).

Figure 3:
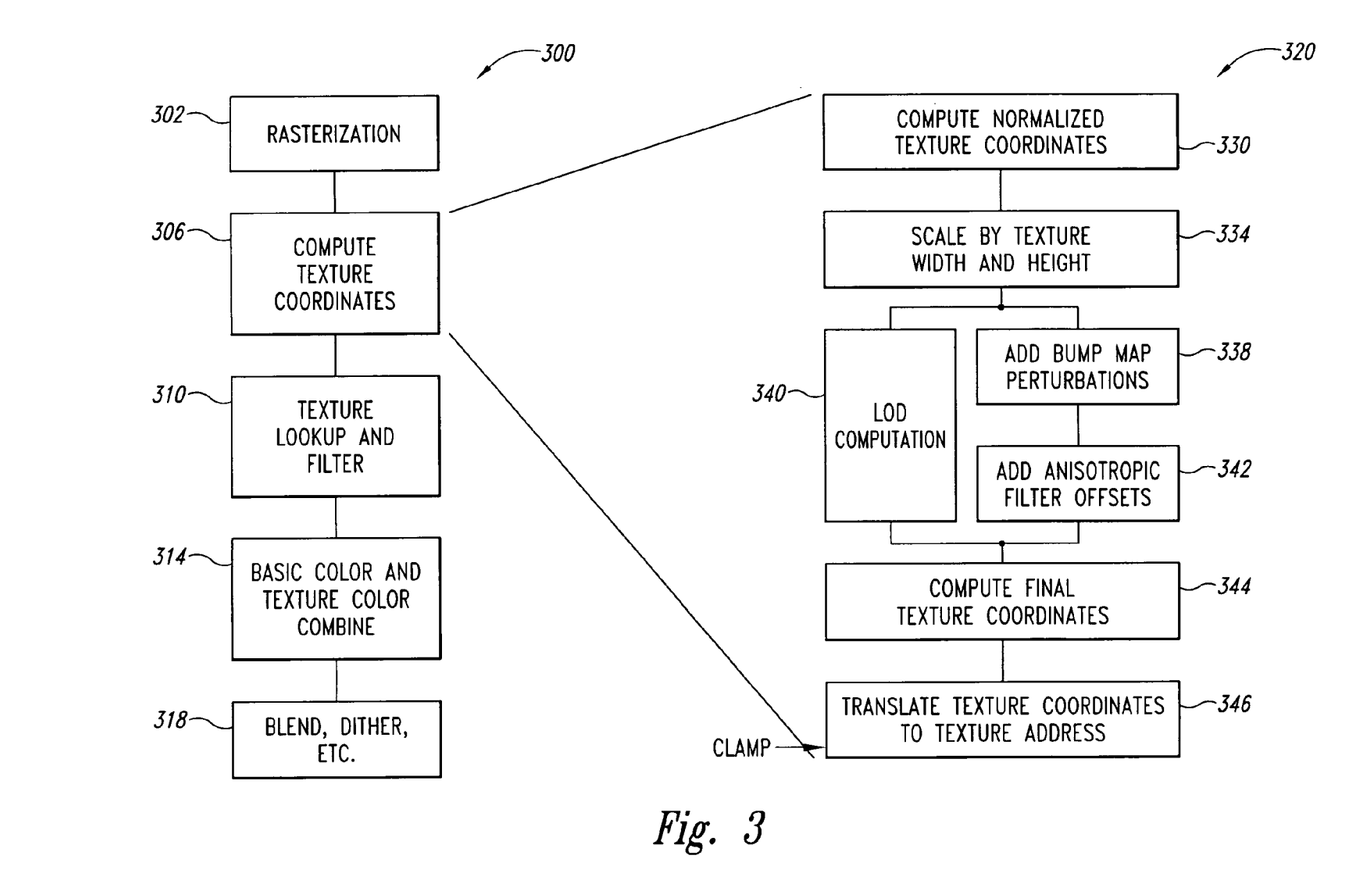
FIG. 3 is a flow diagram of a 3D graphics processing pipeline.

FIG. 3 illustrates a flow diagram 300 of a generic 3D graphics processing pipeline, portions of which are included in the triangle and pixel engines 208 and 212. Following rasterization of the graphics primitives at 302, coordinates of texels needed for the application of a texture map are calculated at 306. The computation of texture coordinates at step 306 is shown in greater detail in flow diagram 320. Initially, the normalized texel coordinates are computed for the desired texels and are then scaled by the width and height of the texture map in which the texels are located. Normalized texel coordinates correspond to the relative position of a texel in a texture map having dimensions between 0 and 1. That is, the width or the height of a texture map is represented over a range of [0:1[(i.e., a range greater than or equal to zero, but less than 1). The normalized coordinates are scaled by multiplying the normalized texel coordinates by the dimensions of the texture map so that the width and height are represented over a range of $[0:\text{tex\_size}_{width}[$ and $[0:\text{tex\_size}_{height}[$, respectively.

The scaled coordinates are then modified at 338 by applying bump map algorithms to create the appearance of additional texture in the form of small surface perturbations. Anisotropic filter offsets are added to the modified texel coordinates at 342 to improve image quality of the textured surface. The scaled coordinates are also used for LOD computations at 340, which are performed in parallel with bump mapping and the anisotropic filter offsets. Final texel coordinates are computed at 344 from the values provided by steps 338 and 342, and 340. The resulting texel coordinates are then translated into texture addresses at 346 corresponding to the memory locations at which the color values for the resulting texel coordinates are stored. It will be appreciated that the computation of texel coordinates, and the scaling, bump mapping, filtering and translating operations, are all well understood in the art, and as such, detailed explanation of the steps may be omitted from herein.

Embodiments of the present invention provide a method and apparatus for performing LOD computations in graphics processing systems which can be implemented to meet arbitrary error constraints and in relatively little chip area. Fixed point datapaths to compute the texture coordinate gradients for a given pixel are used in the LOD computation. These gradients are called du/dx, du/dy, dv/dx, and dv/dy, where (u, v) are texture coordinates (which are normally in the range [0:texture_size-1[, but can exceed this range in some cases) and (x, y) are pixel coordinates. Consequently, the gradient values represent the ratio between the respective texel steps for a pixel step. For example, du/dx represents the ratio between the texel steps along the u-axis for a pixel step along the x-axis.

Conventionally, the LOD is calculated from the equation:

$$LOD = \log_2(rho\_max),$$

where $$rho\_max = \max(rho\_x, rho\_y),$$

and where $$rho\_x = \text{square\_root}((du/dx)^2 + (dv/dx)^2), \text{ and}$$

$$rho\_y = \text{square\_root}((du/dy)^2 + (dv/dy)^2).$$

However, as mentioned previously, this conventional LOD computation is cumbersome and costly to implement in hardware because of the types of computations that need to be performed.

In contrast, embodiments of the present invention simplify the LOD computation by avoiding the need to calculate a square root for the rho_x and rho_y values, and also employs an estimation of the $\log_2(x)$ operation to further simplify the LOD computation. The LOD computation is modified as follows:

$$LOD = \log^2(rho\_max) \rightarrow LOD = \log_2(rho\_max\_squared)^{1/2} \rightarrow LOD = \tfrac{1}{2} \cdot \log_2(rho\_max\_squared),$$

where:

$$(rho\_x\_squared) = (du/dx)^2 + (dv/dx)^2,$$

$$(rho\_y\_squared) = (du/dy)^2 + (dv/dy)^2, \text{ and}$$

$$(rho\_max\_squared) = \max(rho\_x\_squared, rho\_y\_squared).$$

As a result, calculating the square roots for rho_x and rho_y has been avoided and replaced by a divide-by-2 operation. The divide-by-2 operation can be performed in fixed-point math by simply shifting the value right by one bit.

As mentioned previously, embodiments of the present invention also approximate the $\log_2(x)$ computation to further reduce computational, and consequently, hardware complexity. Let rho_max_squared have the unsigned fixed-point data type:

rho_ibits.rho_fbits where rho_ibits is the number of integer bits in rho_max_squared and rho_fbits is the number of fractional bits in rho_max_squared. The choice of rho_ibits is determined by the desired range of LODs. That is, the number of bits should generally be twice the value of the maximum desired LOD value. For example, if the largest LOD value in the graphics system is 10, then rho_bits should be at least 20 bits in length. The choice of rho_fbits depends on the desired error characteristics. As a general rule, including more bits for rho_fbits yields less error, but will be more costly to implement.

The resulting LOD computed from the estimation has the signed fixed-point data type:

lod_ibits.lod_fbits where lod_ibits is the number of integer bits in LOD, including the sign bit, and lod_fbits is the number of fractional bits in LOD. The choice of the number of bits represented by lod_ibits should be guided by the desired range of LODs. For example, if the desired range of LOD is [0:10], then four bits and a sign bit will be sufficient. The choice of lod_fbits depends on other implementation choices in the graphics processing system, such as the design of any texture bilinear interpolation circuits.

After determining the number of bits representing rho and LOD, the $\log_2(x)$ computation is estimated by embodiments of the present invention by the following process.

LZ=leading_zeros(rho_max_squared),

F=rho_max_squared <<LZ,

F'=discard MSB of F and select next (lod_fbits-1) MSBs,

T=rho_bits-1-LZ,

LOD=concatenate(T,F').

In summary, the number of leading zeros of the rho_max_squared value is counted and defined as LZ. The rho_max_squared value is then shifted left by the number of leading zeros LZ and defines as the value F. A six-bit signed integer T is calculated which has the value [(rho_ibits-1)-LZ]. The most significant bit (MSB) of F is discarded and the remaining value is defined as F'. The T and F' values are concatenated and a decimal point is placed five bits from the MSB. This placement of the decimal point implicitly takes care of the divide-by-2 operation mentioned above. The resulting value is the LOD.

Although circuitry to perform the LOD computation has not been expressly shown or described herein, the description provided is sufficient to enable a person of ordinary skill in the art to practice the invention without undue experimentation. The circuitry, control signals, and the like necessary to perform the LOD computation described herein have not been shown in detail in order to avoid unnecessarily obscuring the invention. However, it will be appreciated that embodiments of the present invention can be implemented using conventional logic and circuitry that are well understood in the art.

Figure 4A:
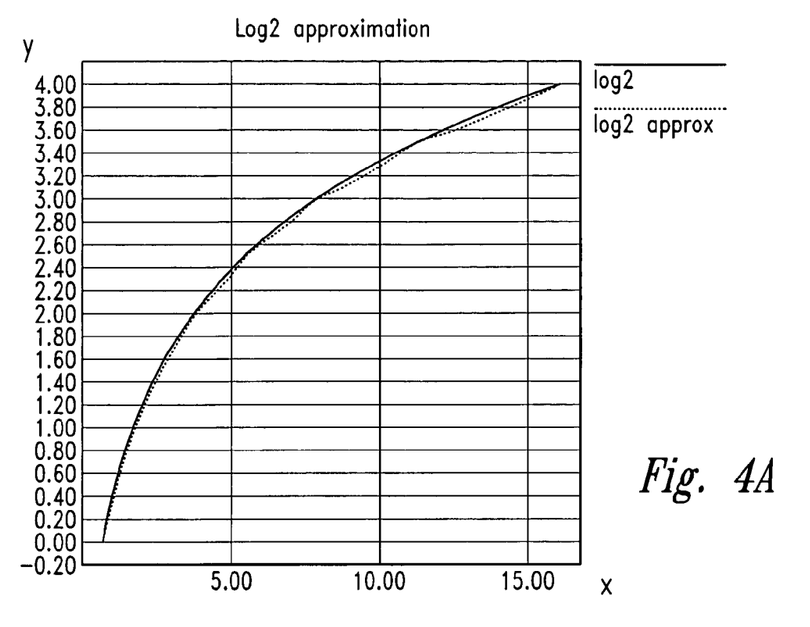
FIGS. 4a and 4b are graphs of a base-two logarithm function, its approximation according to embodiments of the present invention, and the difference between the two.
Figure 4B:
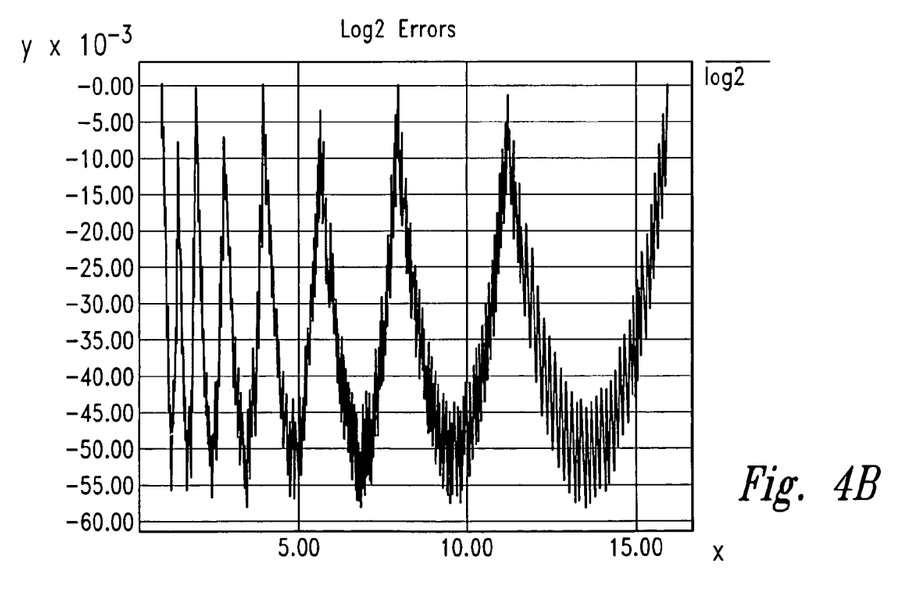

As illustrated by FIGS. 4a–b, the approximation previously described provides relatively close values. FIG. 4a is a graph showing the true $\log_2(x)$ value along with the $\log_2(x)$ approximation previously described. The x-axis represents the texel-to-pixel ratio from 1.0 to 16.0. FIG. 4b is a graph showing the difference between the $\log_2(x)$ curve and the approximation. The maximum absolute value of the difference is 0.058.

Figures 5A, 5B:
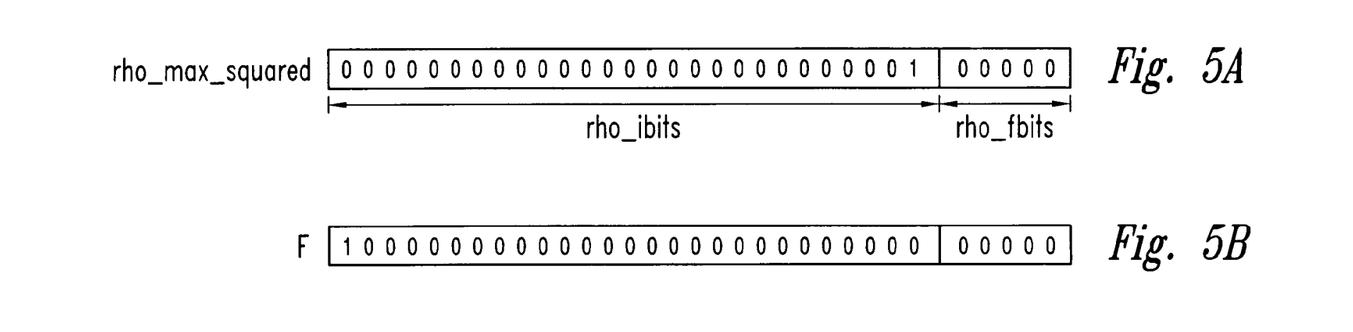
FIGS. 5a–d are diagrams representing the base-two logarithm approximation operation according to embodiments of the present invention.

The $\log_2(x)$ approximation previously discussed will now be illustrated by the following example. It will be appreciated that the specific values described in the example have been selected for the purposes of illustration, and are not intended to limit the scope of the present invention. As mentioned previously, the number of bits representing the values rho_max_squared and LOD can be selected based on the desired error characteristics and LOD. As illustrated in FIG. 5a, for the purposes of this example, rho_max_squared is 32-bit unsigned fixed point number, with rho_ibits= 27 and rho_fbits=5. In this example, rho_max_squared is 1.0. As a result, LZ=26 and, as illustrated in FIG. 5b, the value F is equal to rho_ibits shifted left by 26 bits. Calculating the T value yields:

$$T = [(27-1) - LZ] = [(27-1) - 26] = 0$$

Figure 5C:
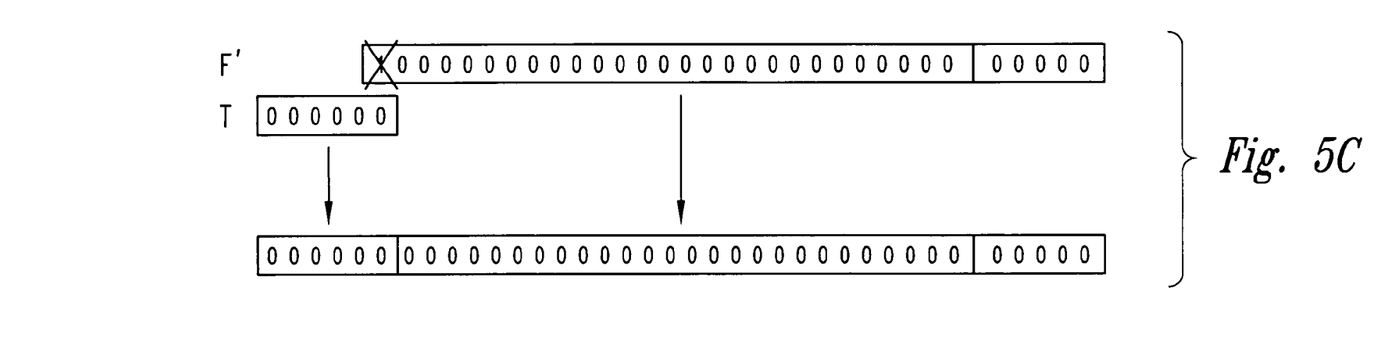
Figure 5D:
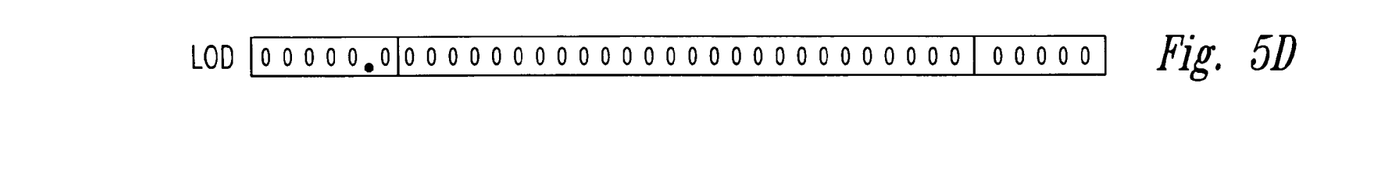

FIG. 5c illustrates the six-bit signed integer T concatenated to F', that is, the F value without the MSB. In FIG. 5d, the decimal point is placed 5-bits from the MSB of the concatenated value to obtain a signed fixed point value for the LOD. For the present example, the smallest meaningful LOD values is –5. However, it will be appreciated that other limitations in the overall graphics processing system may dictate that all negative values are clamped to zero instead. The largest value for the LOD is 13.5. This value may also be clamped to a range that is meaningful within the context of the rest of the graphics processing system. It will be appreciated, however, that the rho_max_squared value can be adjusted accordingly.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for computing a level-of detail (LOD) for application of texels of a texture map to pixels of a graphics image, the method comprising:
   calculating the square of a first ratio between the number of texels for one pixel along a first axis and the square of a second ratio between the number of texels for one pixel along a second axis orthogonal to the first axis;
   selecting the greater of the square of the first ratio and the square of the second ratio;
   approximating a base-two logarithm of the selected square of the ratio; and
   dividing the result by two to provide the LOD.

2. The method of claim 1 wherein dividing the result by two comprises shifting a binary value of the LOD right one-bit.

3. The method of claim 1 wherein the square of the ratio comprises an unsigned fixed-point binary value having a number of integer bits and fractional bits, and approximating a base-two logarithm of the square of the ratio comprises:
   shifting the square of the ratio left by the number of leading zeros (LZs) and ignoring the most significant bit (MSB) of the resulting number to produce a first number;
   calculating a six-bit signed integer value from the equation:

6-bit signed integer=[(number of integer bits-1)-$LZs$];

concatenating the six-bit signed integer value to the first number; and
   defining the five MSBs of the resulting number as the signed integer portion of the LOD.

4. The method of claim 1 wherein the square of the ratio comprises an unsigned fixed-point binary value having an integer portion and a fractional portion.

5. The method of claim 4 wherein the integer portion is 27 bits in length.

6. The method of claim 4 wherein the fractional portion is 5 bits in length.

7. A method for computing a level-of detail (LOD) for application of texels of a texture map to pixels of a graphics image, the method comprising:
   calculating the square of a first ratio between the number of texels for one pixel along a first axis and the square of a second ratio between the number of texels for one pixel along a second axis orthogonal to the first axis;
   selecting the greater of the square of the first ratio and the square of the second ratio for calculating the LOD;
   shifting the selected square of the ratio left by the number of leading zeros (LZs) and ignoring the most significant bit (MSB) of the resulting number to produce a first number;
   calculating a six-bit signed integer value from the equation:

6-bit signed integer=[(number of integer bits-1)-$LZs$], where number of integer bits is the number of integer bits representing the selected square of the ratio;
   concatenating the six-bit signed integer value to the first number;
   defining the five MSBs of the resulting number as a signed integer portion; and
   shifting the resulting binary number right by one-bit to provide the LOD.

8. The method of claim 7 wherein the square of the ratio comprises an unsigned fixed-point binary value having an integer portion and a fractional portion.

9. The method of claim 8 wherein the integer portion is 27 bits in length.

10. The method of claim 8 wherein the fractional portion is 5 bits in length.

11. An apparatus adapted to receive signals representing texel coordinates for texels of a texture map and pixel coordinates for pixels of a graphics image to calculate a level-of-detail (LOD), the apparatus configured to calculate the square of a first ratio between the number of texels for one pixel along a first axis and the square of a second ratio between the number of texels for one pixel along a second axis orthogonal to the first axis, the apparatus further configured to select the greater of the square of the first ratio and the square of the second ratio, approximate a base-two logarithm of the selected square of the ratio, and divide the result of the approximation by two to compute the LOD.

12. The apparatus of claim 11 having a shifting circuit coupled to receive the result of the approximation and adapted to divide the approximation by two by shifting the approximation right one-bit.

13. The apparatus of claim 11 wherein the square of the ratio comprises an unsigned fixed-point binary value having a number of integer bits and fractional bits, and approximating a base-two logarithm of the square of the ratio comprises:
   shifting the square of the ratio left by the number of leading zeros (LZs) and ignoring the most significant bit (MSB) of the resulting number to produce a first number;
   calculating a six-bit signed integer value from the equation:

6-bit signed integer=[(number of integer bits-1)-$LZs$];

concatenating the six-bit signed integer value to the first number; and
   defining the five MSBs of the resulting number as the signed integer portion of the LOD.

14. The apparatus of claim 11 wherein the square of the ratio comprises an unsigned fixed-point binary value having an integer portion and a fractional portion.

15. The apparatus of claim 14 wherein the integer portion is represented by 27 bits.

16. The apparatus of claim 14 wherein the fractional portion is represented by 5 bits.

17. A graphics processing system, comprising:
   a bus interface for coupling to a system bus;
   a graphics processor coupled to the bus interface to process graphics data;
   address and data busses coupled to the graphics processor to transfer address and graphics data to and from the graphics processor;
   display logic coupled to the data bus to drive a display; and
   a LOD computation circuit coupled to the graphics processor adapted to receive signals representing texel coordinates for texels of a texture map and pixel coordinates for pixels of a graphics image to calculate a level-of-detail (LOD), the computation circuit configured to calculate the square of a first ratio between the number of texels for one pixel along a first axis and the square of a second ratio between the number of texels for one pixel along a second axis orthogonal to the first axis, the computation circuit further configured to select the greater of the square of the first ratio and the square of the second ratio, approximate a base-two logarithm of the square of the ratio, and divide the result of the approximation by two to compute the LOD.

18. The graphics processing system of claim 17 wherein the LOD computation circuit comprises a shifting circuit coupled to receive the result of the approximation and adapted to divide the approximation by two by shifting the approximation right one-bit.

19. The graphics processing system of claim 17 wherein the square of the ratio calculated by the LOD computation circuit comprises an unsigned fixed-point binary value having a number of integer bits and fractional bits, and approximating a base-two logarithm of the square of the ratio by the LOD computation circuit comprises:

shifting the square of the ratio left by the number of leading zeros (LZs) and ignoring the most significant bit (MSB) of the resulting number to produce a first number;

calculating a six-bit signed integer value from the equation:

6-bit signed integer=[(number of integer bits−1)−$LZs$];

concatenating the six-bit signed integer value to the first number; and defining the five MSBs of the resulting number as the signed integer portion of the LOD.

20. The graphics processing system of claim 17 wherein the square of the ratio calculated by the LOD computation circuit comprises an unsigned fixed-point binary value having an integer portion and a fractional portion.

21. The graphics processing system of claim 20 wherein the integer portion of the square of the ratio is represented by 27 bits.

22. The graphics processing system of claim 20 wherein the fractional portion of the square of the ratio is represented by 5 bits.

23. The graphics processing system of claim 17 wherein the LOD computed by the LOD computation circuit comprises a signed fixed point binary value having an integer portion and a fractional portion.

24. The graphics processing system of claim 23 wherein the integer portion of the LOD computed by the LOD computation circuit is represented by five bits.

25. A computer system, comprising:
a system processor;
a system bus coupled to the system processor;
a system memory coupled to the system bus; and
a graphics processing system coupled to the system bus, the graphics processing system, comprising:
a bus interface for coupling to a system bus;
a graphics processor coupled to the bus interface to process graphics data;
address and data busses coupled to the graphics processor to transfer address and graphics data to and from the graphics processor;
display logic coupled to the data bus to drive a display; and a LOD computation circuit coupled to the graphics processor adapted to receive signals representing texel coordinates for texels of a texture map and pixel coordinates for pixels of a graphics image to calculate a level-of-detail (LOD), the computation circuit configured to calculate the square of a first ratio between the number of texels for one pixel along a first axis and the square of a second ratio between the number of texels for one pixel along a second axis orthogonal to the first axis, the apparatus further configured to select the greater of the square of the first ratio and the square of the second ratio, approximate a base-two logarithm of the square of the ratio, and divide the result of the approximation by two to compute the LOD.

26. The computer system of claim 25 wherein the LOD computation circuit comprises a shifting circuit coupled to receive the result of the approximation and adapted to divide the approximation by two by shifting the approximation right one-bit.

27. The computer system of claim 25 wherein the square of the ratio calculated by the LOD computation circuit comprises an unsigned fixed-point binary value having a number of integer bits and fractional bits, and approximating a base-two logarithm of the square of the ratio by the LOD computation circuit comprises:

shifting the square of the ratio left by the number of leading zeros (LZs) and ignoring the most significant bit (MSB) of the resulting number to produce a first number;

calculating a six-bit signed integer value from the equation:

6-bit signed integer=[(number of integer bits−1)−$LZs$];

concatenating the six-bit signed integer value to the first number; and defining the five MSBs of the resulting number as the signed integer portion of the LOD.

28. The computer system of claim 25 wherein the square of the ratio calculated by the LOD computation circuit comprises an unsigned fixed-point binary value having an integer portion and a fractional portion.

29. The computer system of claim 28 wherein the integer portion of the square of the ratio calculated by the LOD computation circuit is represented by 27 bits.

30. The computer system of claim 28 wherein the fractional portion of the square of the ratio calculated by the LOD computation circuit is represented by 5 bits.

31. The computer system of claim 25 wherein the LOD computed by the LOD computation circuit comprises a signed fixed point binary value having an integer portion and a fractional portion.

32. The computer system of claim 31 wherein the integer portion of the LOD computed by the LOD computation circuit is represented by five bits.

* * * * *